United States Patent Office 3,446,896
Patented May 27, 1969

3,446,896
KILLING OF PESTS WITH ALKYL SULFONAMIDE PHOSPHATES AND PHOSPHONATES
Karoly Szabo, Orinda, Llewellyn W. Fancher, Lafayette, and David J. Broadbent, San Jose, Calif., assignors to Stauffer Chemical Company, New York, N.Y., a corporation of Delaware
No Drawing. Original application Sept. 25, 1964, Ser. No. 399,369, now Patent No. 3,368,001, dated Feb. 6, 1968. Divided and this application Dec. 13, 1967, Ser. No. 714,379
Int. Cl. A01m 9/36
U.S. Cl. 424—211
6 Claims

ABSTRACT OF THE DISCLOSURE

The killing of insects, mites and fungi with a compound of the formula

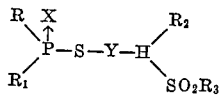

in which R and $R_1$ are lower alkoxy or lower alkyl groups; $R_2$ is hydrogen, lower alkyl or lower haloalkyl; $R_3$ is lower alkyl; (when $R_2$ is hydrogen) and $R_3$ is lower alkyl, pheny or halophenyl (when $R_2$ is lower alkyl or lower haloalkyl); X is oxygen or sulfur; and Y is divalent lower alkylene or lower alkylalkylene group.

---

This application is a division of copending application Ser. No. 399,369, filed Sept. 25, 1964, now U.S. Patent 3,368,001, granted Feb. 6, 1968.

This invention relates to new and novel class of phosphorous containing organic compounds and to the use of same as insecticides and acaricides. More specifically, this invention relates to certain new substituted alkyl sulfonamide phosphates and phosphonates and to the use of said compounds in insecticidal compositions. The compounds are particularly valuable for their insecticidal and miticidal properties. Fungicidal activity has also been observed for compounds of the present invention.

This invention relates to compounds corresponding to the general formula

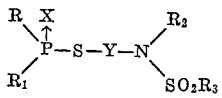

wherein R and $R_1$ are selected from the group consisting of lower alkoxy and lower alkyl, $R_2$ is selected from the group consisting of hydrogen, lower alkyl, lower haloalkyl; when $R_2$ is hydrogen $R_3$ is lower alkyl and when $R_2$ is lower alkyl and lower haloalkyl $R_3$ is selected from the group consisting of lower alkyl, phenyl and halophenyl; X is selected from the group consisting of sulfur and oxygen and Y is selected from the group consisting of divalent lower alkylene and lower alkylalkylene. The invention includes methods of preparation, utility and application of said compounds.

The various methods of preparing representative compounds of the present invention, as well as the manner of utilizing them in insecticidal compositions, are illustrated in the following nonlimiting examples.

Example 1

N-[2-(O,O-diethyl-phosphorodithioyl) - propyl] - methanesulfonamide.—Potassium - O,O - diethylphosphorodithioate (11.2 g., 0.05 M), N-(2-chloropropyl)methanesulfonamide (8.6 g., 0.05 M), and methylethyl ketone (40 ml.) were brought together in a reaction flask equipped with stirrer, reflux condenser and thermometer. The mixture was refluxed for 3 hours, during which time potassium chloride precipitation was noted. The mixture was allowed to cool to ambient temperature and was filtered. The filtrate was washed with 5% sodium bicarbonate solution and then washed with water. The filtrate was then dried over anhydrous magnesium sulfate and stripped of solvent by heating to 110° C. to 20 mm. A clear yellow liquid was obtained in a yield of 13 g. which analyzed in good agreement with the above compounds, $n_D^{25}=1.4957$

Example 2

N-[2-(O-ethyl-ethylphosphonodithioyl)-propyl] - methane-sulfonamide.—O-ethyl - ethylphosphonodithioic acid (8.7 g.), sodium methoxide (2.7 g.), N-(2-chloropropyl)-methanesulfonamide (8.6 g.) and ethanol (50 ml.) were combined in a reactor and refluxed for 12 hours. The precipitated salt was filtered off, and the solvent removed at reduced pressure. The residue was taken up in benzene (50 ml.), washed with 5% sodium bicarbonate solution and water and dried over anhydrous magnesium sulfate. After removal of the volatile solvent at reduced pressure, a yield of 10 g. of yellow oily product was obtained, $n_D^{25}=1.5196$.

Example 3

N-[2-(O-ethyl-ethylphosphonodithioyl) - ethyl] - methanesulfonamide.—O - ethyl - ethylphosphorodithioic acid (8.5 g.), N-(2-chloroethyl)methanesulfonamide (11.8 g.), triethylamine (5.1 g.) and acetone (50 ml.) were brought together by adding dropwise the triethylamine to the mixture of the other reagents. The mixture was refluxed for 2½ hours. After filtration of the triethylamine hydrochloride, the solvent was removed at reduced pressure. There was obtained a quantitative yield of a yellow liquid, which analyzed in good agreement with the title compound, $n_D^{25}=1.5230$.

Example 4

N-[2 - (O - ethyl - methylphosphonodithioyl) - ethyl]-methanesulfonamide.—To a solution of sodium (4.6 g.) in ethanol (100 ml.), N-(2-chloroethyl)methanesulfonamide (15.8 g.) and O-ethyl-methylphosphonodithioic acid (15.6 g.) were successively added. The mixture was refluxed for 2 hours and a heavy salt precipitation was obtained. The reaction mixture was poured into 200 ml. of water, acidified with hydrochloric acid and extracted with 3 portions of methylene chloride. The combined organic layers were dried over magnesium sulfate, filtered, and stripped of solvent. A yellow oil was obtained as the product at 1 mm. and 130° C., $n_D^{25}=1.5453$. Analysis was in accordance with the given title compound.

Example 5

N-[(O-ethyl-methylphosphonodithioyl) - methyl] - N-(2-chloroethyl)-methanesulfonamide.—This member of the group was prepared by azeotroping O-ethyl-S-methylol-methylphosphonodithioate and (N - (2 - chloroethyl)-methanesulfonamide in benzene for 4 hours. There was obtained a viscous pale yellow oil, $n_D^{25}=1.5460$.

Example 6

N-[2-(O,O-diethyldithiophosphoryl) - ethyl] - methanesulfonamide.—N-β-bromoethylmethanesulfonamide (21.0 g.) was dissolved in 125 ml. of methanol. To this solution was added 31.2 g. of sodium diethyldithiophosphate and 4.0 ml. of triethylamine. The mixture was stirred and refluxed for 6 hours. The solvent and other volatiles were removed on a steam bath. The residue was taken up in ether, washed with water, dried over anhydrous magnesium sulfate, filtered and evaporated to give 25.0 g. (80.6% of theory yield of liquid product, $n_D^{30}=1.5248$.

It should be mentioned that in place of methanol as a solvent there can be used methylethyl ketone, acetone or other alcohol. Use of triethylamine is optional. Other dithio salts, such as ammonium, potassium or the like may also be used.

Example 7

N-methyl-N - [2 - (O,O - diethylmonothiophosphoryl)-ethyl]-benzenesulfonamide.—N-methyl-N-(β-phenyl sulfonatoethyl)-benzenesulfonamide (17.8 g.) were dissolved in 75 ml. of methylethyl ketone. To this solution was added 15.4 g. of sodium diethylmonothiophosphate. The mixture was stirred and refluxed for one hour. The precipitated solid was filtered off and washed with methylethyl ketone. The filtrate and washings were combined and evaporated to a low volume. The residue was taken up in benzene, washed three times with water, dried over anhydrous magnesium sulfate, filtered, and the solvent removed on a steam both. There was obtained a liquid, 16.7 g. (91% yield), $n_D^{30} = 1.5332$.

Using the method of the foregoing examples, the following compounds were prepared. Compound numbers have been assigned to each compound and are used hereinafter throughout the balance of the application for convenience.

known procedures. The results are listed in Table II under HF.

Acaricidal evaluation tests.—The two-spotted mite, *Tetranychus telarius* (Linn.), was employed in tests for acaricidal activity. Young pinto bean plants were infested with several hundred mites. Dispersions of tests compounds were prepared by dissolving 0.10 gram of the candidate in ten milliliters of acetone. This solution was then diluted with water containing 0.0175% v./v. of Sponto 221®, an emulsifying agent. The amount of water was sufficient to give concentrations of active ingredient ranging from 0.10% to 0.001%. The test suspensions were sprayed on the infested pinto bean plants. After seven and fourteen days the plants were examined both for post-embryonic forms of the mite as well as for eggs. The percentage of kill was determined by comparison with control plants which had not been sprayed. The LC–50 value was calculated using well-known procedures. The LC–50 values are reported under the column Two-Spotted Mite in Table II: PE indicates post-embryonic forms while E indicates eggs.

Systemic toxicity evaluations.—Some of the compounds of the present invention exhibited systemic toxicity against two-spotted mites. Pinto bean plants in the primary leaf

TABLE I $$\underset{R_1}{\overset{R}{\diagdown}}\overset{X}{\underset{\uparrow}{P}}-S-Y-N\underset{SO_2R_3}{\overset{R_2}{\diagup}}$$

| Compound No. | R | $R_1$ | $R_2$ | $R_3$ | X | Y |
|---|---|---|---|---|---|---|
| 1[1] | $C_2H_5O$ | $C_2H_5O$ | H | $CH_3$ | S | $CH(CH_3)CH_2$ |
| 2[1] | $C_2H_5$ | $C_2H_5O$ | H | $CH_3$ | S | $CH(CH_3)CH_2$ |
| 3 | $C_2H_5$ | $CH_3O$ | H | $CH_3$ | S | $CH(CH_3)CH_2$ |
| 4[1] | $C_2H_5$ | $C_2H_5O$ | H | $CH_3$ | S | $CH_2CH_2$ |
| 5 | $CH_3$ | $CH_3O$ | H | $CH_3$ | S | $CH_2CH_2$ |
| 6 | $CH_3$ | $CH_3O$ | H | $CH_3$ | S | $CH(CH_3)CH_2$ |
| 7[1] | $CH_3$ | $C_2H_5O$ | H | $CH_3$ | S | $CH_2CH_2$ |
| 8[1] | $CH_3$ | $C_2H_5O$ | $CH_2CH_2Cl$ | $CH_3$ | S | $CH_2$ |
| 9 | $CH_3$ | $CH_3O$ | H | $CH_3$ | S | $CH(CH_3)CH_2$ |
| 10 | $C_2H_5$ | $C_2H_5O$ | H | $C_2H_5$ | S | $CH_2CH_2$ |
| 11 | $CH_3$ | $C_2H_5$ | H | $C_2H_5$ | S | $CH_2CH_2$ |
| 12 | $CH_3O$ | $CH_3O$ | H | $CH_3$ | S | $CH_2CH_2$ |
| 13 | $CH_3$ | $CH_3O$ | H | $C_2H_5$ | S | $CH_2CH_2$ |
| 14[1] | $C_2H_5O$ | $C_2H_5O$ | $CH_3$ | $C_6H_5$ | S | $CH_2CH_2$ |
| 15 | $C_2H_5O$ | $C_2H_5O$ | $CH_3$ | $C_6H_5$ | S | $CH_2CH_2$ |
| 16 | $i-C_3H_7O$ | $i-C_3H_7O$ | $CH_3$ | $C_6H_5$ | S | $CH_2CH_2$ |
| 17 | $CH_3O$ | $CH_3O$ | $CH_3$ | $C_6H_5$ | O | $CH_2CH_2$ |
| 18[1] | $C_2H_5O$ | $C_2H_5O$ | $C_2H_5$ | $C_6H_5$ | S | $CH_2CH_2$ |
| 19 | $C_2H_5O$ | $C_2H_5O$ | $C_2H_5$ | $C_6H_5$ | O | $CH_2CH_2$ |
| 20 | $C_2H_5O$ | $C_2H_5O$ | $C_2H_5$ | $C_6H_4Cl$ | S | $CH_2CH_2$ |
| 21 | $C_2H_5O$ | $C_2H_5O$ | $CH_3$ | $C_6H_4Cl$ | S | $CH_2CH_2$ |
| 22 | $C_2H_5O$ | $C_2H_5O$ | $CH_3$ | $C_2H_5$ | S | $CH_2CH_2$ |
| 23 | $C_2H_5O$ | $C_2H_5O$ | $CH_3$ | $C_2H_5$ | S | $CH_2CH_2$ |
| 24 | $CH_3O$ | $CH_3O$ | $CH_3$ | $C_2H_5$ | S | $CH_2CH_2$ |

[1] Compound No. 1 prepared in Example 1; compound No. 2 prepared in Example 2; compound No. 4 prepared in Example 3; compound No. 7 prepared in Example 4; compound No. 8 prepared in Example 5; compound No. 14 prepared in Example 6; compound No. 18 prepared in Example 7.

The class of compounds characterized by the foregoing examples has been found to have valuable pesticidal properties. The following tests demonstrate some of the pests on which the compounds were found active. The tests were conducted according to the following methods.

Insecticidal evaluation tests.—The insect species, Housefly (HF) *Musca domestica* (Linn.), was subjected to evaluation tests for insecticides. The tests insects were caged in cardboard mailing tubes with cellophane bottoms and coarse mesh nylon tops. Each cage was supplied with food and water. The toxicant was dissolved in a volatile solvent, preferably acetone, the active compound was pipetted into a petri dish bottom, allowed to air dry and then placed in a cardboard mailing tube. Twenty-five female flies, three to five days old, were caged in the tube. The flies were continuously exposed to the known residue of the active compound in the cage. Final mortality readings were taken forty-eight hours after initiation of the test. The LD–50 values were calculated using wellstage were placed in bottles containing 200 ml. of the test solution and held in place with cotton plugs. One plant per flank was used. Only the roots were immersed. This test evaluates the root absorption and upward translocation of the candidate compound. The test solutions were prepared by dissolving the compound in 10 ml. of acetone. This solution was then diluted with distilled water, the amount of water being sufficient to give concentrations of active ingredient ranging from ten parts per million (p.p.m.) to 0.1 part per million. Immediately after the plants were placed in the test solutions they were infested with mites, *Tetranychus telarius* (Linn.).

After seven and fourteen days the plants were examined both for post-embryonic forms of the mite as well as eggs. The percentage of kill was determined by comparison with control plants which had been placed in distilled water only. Again the LD50 value was calculated and reported in Table II under the column Systemic.

TABLE II

| Compound No. | HF (μg.) | Two-spotted mite PE (percent) | E (percent) | Systemic (p.p.m.) |
|---|---|---|---|---|
| 1 | 50 | .03 | | |
| 2 | 100 | .003 | .05 | 3 |
| 3 | >100 | .003 | .05 | 3 |
| 4 | 80 | .001 | | 1 |
| 5 | 8 | >.01 | .1 | 0.3 |
| 6 | 100 | .0008 | .001 | 1 |
| 7 | 10 | >.01 | .1 | 0.5 |
| 8 | 70 | .005 | .008 | |
| 9 | >100 | .008 | >.05 | 5 |
| 10 | 25 | .01 | .03 | 2 |
| 11 | 30 | .0005 | .003 | 0.75 |
| 12 | 25 | .008 | .01 | 0.75 |
| 13 | 50 | .008 | .01 | 0.5 |
| 14 | 100 | .01 | .01 | 3 |
| 15 | 75 | .01 | .03 | |
| 16 | 100 | .1 | .1 | |
| 17 | 10 | .1 | .1 | |
| 18 | 20 | .01 | .05 | |
| 19 | 50 | .05 | .08 | |
| 20 | 30 | .1 | .1 | |
| 21 | 100 | .05 | | |
| 22 | 80 | .03 | | |
| 23 | 100 | .003 | .005 | 3 |
| 24 | 100 | .005 | | 8 |

The candidate compounds were also tested for fungicidal activity. Compounds 1, 2, 3, 6, 8 and 14 were found to have particularly good fungicidal activity, especially in the control of bean rust. These compounds exhibited a particular effect in controlling fungus infection from the test species on the host plants.

The compounds of the present invention may be applied to a pest habitat in ways well-known to those skilled in the art, such as dusts, sprays of solutions or dispersions and the like. Aqueous as well as nonaqueous solutions are equally suitable.

We claim:

1. The method of killing pests selected from group consisting of insects, mites and fungi comprising applying to a pest habitat an effective amount of a compound of the formula

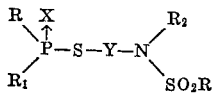

wherein R and $R_1$ are selected from the group consisting of lower alkoxy and lower alkyl groups, $R_2$ is selected from the group consisting of hydrogen, lower alkyl, lower haloalkyl; when $R_2$ is hydrogen $R_3$ is lower alkyl, and when $R_2$ is lower alkyl and lower haloalkyl $R_3$ is selected from the group consisting of lower alkyl, phenyl and halophenyl, X is selected from the group consisting of divalent lower alkylene and lower alkylalkylene groups.

2. The method of killing pests selected from the group consisting of insects, mites and fungi comprising applying to a pest habitat an effective amount of the compound N-[2-(O-methylmethylphosphonodithioyl)-ethyl] - methanesulfonamide.

3. The method of killing pests selected from the group consisting of insects, mites and fungi comprising applying to a pest habitat an effective amount of the compound N - [2 - (O - methylmethylphosphonodithioyl) - propyl]-methanesulfonamide.

4. The method of killing pests selected from the group consisting of insects, mites and fungi comprising applying to a pest habitat an effective amount of the compound N-methyl-N-[2-(O,O-diethylmonothiophosphoryl)-ethyl]-benzenesulfonamide.

5. The method of killing pests selected from the group consisting of insects mites and fungi comprising applying to a pest habitat an effective amount of the compound N-methyl-N-[2-(O,O - diethyldithiophosphoryl) - ethyl]-ethanesulfonamide.

6. The method of killing pests selected from the group consisting of insects, mites and fungi comprising applying to a pest habitat an effective amount of the compound N-[2-(O-ethylmethylphosphonodithioyl) - ethyl] - ethanesulfonamide.

References Cited

UNITED STATES PATENTS 3,205,253   9/1965   Fancher et al. _____ 260—944

ALBERT T. MEYERS, *Primary Examiner.*

S. J. FRIEDMAN, *Assistant Examiner.*

PO-1050
(5/69)

UNITED STATES PATENT OFFICE
CERTIFICATE OF CORRECTION

Patent No. 3,446,896      Dated May 27, 1969

Inventor(s) Karoly Szabo et al.

It is certified that error appears in the above-identified patent and that said Letters Patent are hereby corrected as shown below:

In the Abstract of the Disclosure, the formula should read:

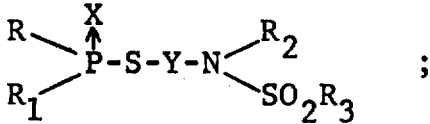

line 4 after the formula, the word "pheny" should read "phenyl".

In Column 2, line 7, the last word "to" should read "at"; Example 5, line 4, the phrase "(N-(2-chloroethyl)-" should read "N-(2-chloroethyl)-".

Column 3, line 18, the word "both" should read "bath".

Column 4, line 59, the word "flank" should read "flask".

Column 5, Claim 1, the formula should read:

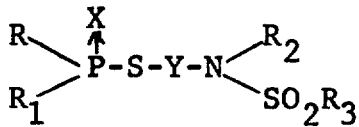

Column 6, line 8, of --sulfur and oxygen and Y is selected from the group consisting of--.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents